United States Patent

Mihatsch

[19]

[11] Patent Number: 6,029,157
[45] Date of Patent: Feb. 22, 2000

[54] METHOD FOR DETERMINING STATE PARAMETERS OF A CHEMICAL REACTOR WITH ARTIFICIAL NEURAL NETWORKS

[75] Inventor: Oliver Mihatsch, Munich, Germany

[73] Assignee: Siemens Aktiengesellschaft, Munich, Germany

[21] Appl. No.: 08/691,248

[22] Filed: Aug. 2, 1996

[30] Foreign Application Priority Data

Aug. 2, 1995 [DE] Germany .......................... 195 28 426

[51] Int. Cl.[7] ............................................... G06F 15/18
[52] U.S. Cl. .............................. 706/15; 706/16; 706/19; 706/23; 706/25; 706/906
[58] Field of Search ...................... 395/21, 906; 364/500, 364/501, 502, 503; 706/15–16, 23, 25, 906, 10, 19

[56] References Cited

U.S. PATENT DOCUMENTS 5,426,721  6/1995  Kak ........................................... 706/31

OTHER PUBLICATIONS

Bulsari et al., "A feed–forward neural network as a chemical reactor selection expert system," Scandanavian Conference on Artificial Intelligence, May 1991, Amsterdam, Netherlands, p71–76.

More, "The levenberg–marquardt algorithm: implementation and theory" Dec. 1978.

Hilhorst, "Neural Network based control of mode–switch processes," Advanced control of chemical processes, Toulouse, France, pp. 267–272, Dec. 1991.

Peel, "Globally linearising control using artificial neural networks," IEEE conference on control pp. 967–972, Mar. 1994.

Hong Te Su, "Neural model predictive control of nonlinear chemical processes," IEEE Proceedings of the international sysmposium on intelligent control, Aug. 1993.

"Practical Optimization", Academic Press, Gill et al., pp. 136–137, 1981.

"Identification and Control of Dynamical Systems Using Neural Networks", IEEE Trans. Neural Networks, vol. 1, S. 491–513, K. Narenda.

"Neural Networks and Their Applications", Rev. Sci. Instrum. 65, S. 1803–1832, C. Bishop, 1994.

"Nonlinear Multivariate Mapping of Chemical Data Using Feed–Forward Neural Networks", Anal. Chemie., T. Blank, S. 3081–3089, 1993.

"Bioprocess Monitoring and Control", M.N. Pons. S. 251–29, 333–358, 1991.

Nonlinear Oscillations, Dynamical Systems, and Bifurcations of Vector Fields, Springer–Verlag, ISBN., S. 117–165, J. Guckenheimer et al., 1983.

*Primary Examiner*—Robert W. Downs
*Assistant Examiner*—Jason W. Rhodes
*Attorney, Agent, or Firm*—Hill & Simpson

[57] ABSTRACT

A sequence of measured quantities is determined for a chemical reactor and a data generator generates a curve in normal coordinates from a respective predetermined normal form that describes a type of critical state. Each normal form is imaged onto the sequence of measured quantities by neural networks whereby a respective neural network is allocated to a data generator. The imaging is optimized by applying parameter optimization methods. The neural network that converges best through use of parameter optimization method describes the critical state that lies closest to the actual state of the chemical reactor.

4 Claims, 6 Drawing Sheets

METHOD FOR DETERMINING STATE PARAMETERS OF A CHEMICAL REACTOR WITH ARTIFICIAL NEURAL NETWORKS

BACKGROUND OF THE INVENTION

1. Field of the Invention

The present invention relates generally to the field of chemical reactors, and, more particularly, the present invention relates to a chemical reactor which is optimally controlled through the use of neural networks.

2. Description of the Related Art

Discontinuous changes of a reactor can suddenly and unknowingly occur in continuously operated chemical reactors. For example, when the temperature rises greatly or if the reaction yield drops rapidly with an unsuspected discontinuous change of the reactor state, this leads to production outages and reactor malfunctions. These phenomena can be explained as follows by what are referred to as critical states.

The dynamic behavior of a continuous reactor is mathematically described by a parameter-dependent differential equation, $$\dot{x} = f(x, \mu) \quad (1).$$

The variable x is a vector. It contains all reactor states. For example, these can be the concentrations of the participating chemical compounds or the temperature of the mixture etc.

The behavior of the reactor is determined by a plurality of external influencing quantities $\mu$ that are determined by the operator or the environment. For example the average dwell time of the substances in the reactor kettle, the cooling rate, the reaction rates of the substances in the reactor kettle or the kettle pressure of the reactor are all types of influencing qualities. The reactor is operated in a stationary, i.e. chronologically constant state, i.e.

$$\dot{x} = 0 = f(x, \mu) \quad (2).$$

Depending on the existing parameter value $\mu$, there are usually a plurality of possible stationary states $x(\mu)$ that are connected to one another in an extremely complicated way. A critical state occurs where, given variation of the parameters $\mu$, a stationary state $x(\mu)$ ceases to exist or becomes unstable. The reactor then changes discontinuously from one stationary state to the next or begins to oscillate. This can lead to uncontrollable situations.

There are no sufficiently precise mathematical models available for the dynamic description of the processes sequencing in the reactor. All possible external influencing quantities are also not known. Important parameters $\mu$ can consequently vary without being noticed at first. This leads to malfunctions if critical points are reached.

It is known that the dynamic behavior of a continuous reactor in a local environment of a critical state can be mathematically described by a parameter-dependent differential equation, the so-called normal form (J.Guckenheimer et al., Nonlinear Oscillations, Dynamical Systems, and Bifurcations of Vector Fields, Springer-Verlag, ISBN 0-540-90819-6, pp.117–165, 1983). Each normal form represents exactly one type of a critical state. The present invention solves the problem of determining state parameters of a chemical reactor through the use of artificial neural networks.

SUMMARY OF THE INVENTION

In the present invention, curves for normal coordinates are generated by at least one data generator for at least one prescribed normal form. Each of these curves is transformed into identified measured quantities by its own neural network with a parameter optimization method. The optimized parameters of the neural network and of the data generator are employed as state parameters of the chemical reactor. The method of the present invention has a number of significant advantages. It provides a reliable, automatic determination of important state parameters for a chemical reactor even though a global model for describing all states of the chemical reactor does not exist. It also provides a direct evaluation of the identified state parameters in view of the stability of the reactor state as well as in view of determining the closest type of critical state of the chemical rector.

The use of a plurality of data generators, i.e. for considering several types of critical states makes it possible to draw conclusions about the type of critical state closest to the current state of the chemical reactor directly from the convergence behavior of all data generators and neural networks.

DETAILED DESCRIPTION OF THE PREFERRED EMBODIMENTS

Figure 1:
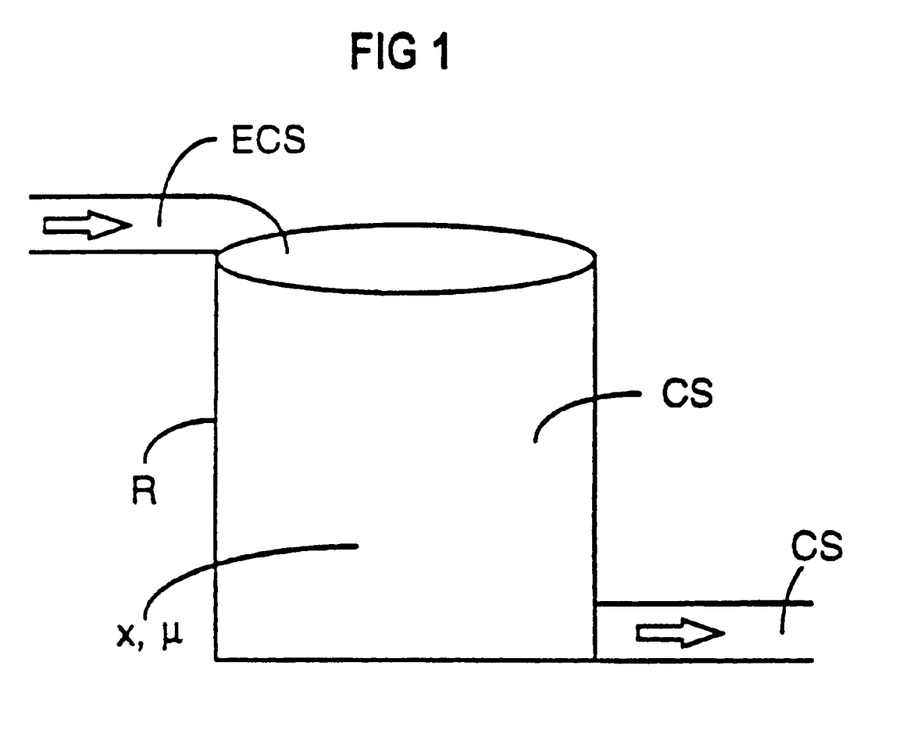
FIG. 1 illustrates a chemical reactor whose state parameters are to be determined.

FIG. 1 illustrates a chemical reactor R. A specific amount of an entering chemical substance, ECS, continuously flows into the chemical reactor. A chemical reaction occurs in the chemical reactor R, as a result whereof the entering chemical substance ECS is converted into a chemical substance CS. The resultant chemical substance CS flows continuously out of the chemical reactor R. The time that each atom remains in the chemical reactor R on average is referred to as average dwell time. The chemical substance CS is exposed to the influence of a plurality of external influencing quantities $\mu_i$ (i=i through d, d $\in$ N) in the chemical reactor R.

The external influencing quantities $\mu_i$ are, for example, the average dwell time of the substance in the chemical reactor R, the cooling rate of the chemical reactor R, reaction rates that indicate the speed of the chemical reactions or the kettle pressure to which the chemical reactor R is subject. The external influencing quantities $\mu_i$ are determined by the operator of the chemical reactor R or by the environment. The possibilities outlined above as to what parameters can be viewed as being influencing quantities $\mu_i$ are in no way exhaustive. Many other parameters influencing the chemical behavior of the chemical reactor R are thus other external influencing quantities $\mu_i$. It is not possible or even necessary to recite all external influencing quantities $\mu_i$.

It may already be seen herefrom that it is thus not possible to define an exact global mathematical model in the form of a differential equation system for the description of the dynamic behavior of the chemical reactor R. One prerequisite for a global, exact mathematical model would at the very least be knowledge of all external influencing quantities $\mu_i$, but this does not exist.

The absolute evaluation of known influencing quantities $\mu_i$ is also not yet formally possible, i.e. what influencing quantities $\mu_i$ have exactly what effect on the dynamic behavior of the chemical reactor R and on the chemical substance CS located in the chemical reactor R is not yet precisely known.

An exemplary embodiment of the method of the present invention is described below with only one external influencing quantity $\mu$. The influencing quantity $\mu$ can be interpreted as a vector that comprises all known outside influencing quantities $\mu_i$. In this case, too, the preferred exemplary embodiment described below can be applied in exactly the same way. The reduction to only one one-dimensional influencing quantity $\mu$ serves only for a more straightforward and, thus, simpler presentation of the inventive method.

As was set forth above, the dynamic behavior of the continuous chemical reactor R is mathematically described by a parameter-dependent differential equation, $$\dot{x}=f(x,\mu) \qquad (1).$$

The chemical reactor R is operated in a stationary, i.e. chronologically constant state, $$\dot{x}=0=f(x,\mu) \qquad (2).$$

Figure 2:
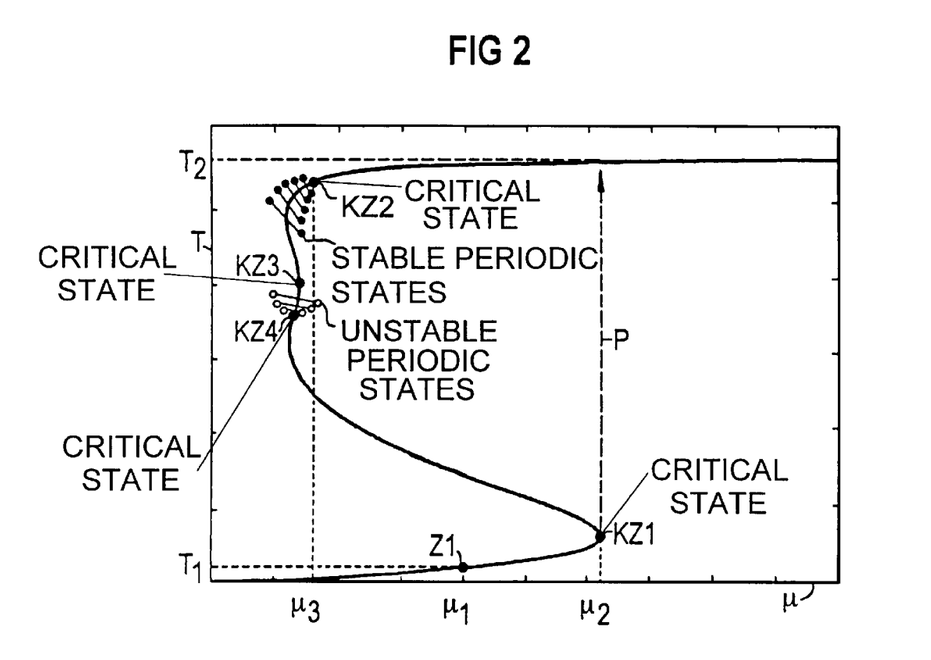
FIG. 2 illustrates a curve that shows the dependency of the stationary reactor states by way of example, which in this case is the dependency of the temperature T of the chemical reactor on a parameter $\mu$.

Depending on the influencing quantity $\mu$, there are usually a plurality of possible stationary states $x(\mu)$ that are related to one another in an extremely complicated way. With reference to a simple reactor model that is discussed in J.Moiola et al., Computing Bifurcation Points Via Characteristic Gain Loci, IEEE Trans.Autom.Contr., 36, pp.358–362, 1991, FIG. 2 shows a function by way of example that describes the dependence of the stationary states $x(\mu)$ of the chemical reactor R on the influencing quantity $\mu$.

In this simple reactor model, the influencing quantity $\mu$ is represented by the average dwell time of the chemical substance CS in the chemical reactor R. FIG. 2 thus shows the dependence of a temperature T—that corresponds to a stationary state $x(\mu)$ of the chemical reactor R—of the chemical reactor R dependent on the influencing quantity $\mu$, the average dwell time of the chemical substance CS in the chemical reactor R in this example.

Let it be assumed that the chemical reactor R is in a first state Z1 at a relatively low, first temperature $T_1$. In the first state Z1, the chemical reactor R is at a first dwell time $\mu_1$ of the chemical substance CS in the chemical reactor R. When the average dwell time $\mu$, i.e. an external influencing quantity $\mu$, increases slowly and unnoticed, this initially does not significantly effect the temperature T of the chemical reactor R, as may be seen from FIG 2.

However, as soon as a first critical state KZ1 given an average dwell time $\mu_2$ is exceeded, the temperature T of the chemical reactor R suddenly rises to a new, higher level. This is indicated by an arrow P in FIG. 2, proceeding from the first critical state KZ1. A second temperature $T_2$ of the chemical substance CS in the chemical reactor R is now established. Even if the average dwell time $\mu$, i.e. an arbitrary external influencing quantity $\mu_i$ given a more complex reactor model, drops again, the temperature T of the chemical reactor R will no longer return to the original value, the first temperature $T_1$, but will continue to remain at a very high level close to the second temperature $T_2$.

When, however, the influencing quantity $\mu$, i.e. the average dwell time $\mu$, drops below a third dwell time $\mu_3$, the temperature T of the chemical reactor no longer remains chronologically constant but begins to oscillate. This occurs after a second critical state KZ2 of the chemical reactor R is reached. Mathematically, the critical states KZ1, KZ2, KZ3 and KZ4 are referred to as local bifurcations. They are the cause of the discontinuous behavior of the chemical reactor R. Several types of critical states KZ are distinguished according to their qualitative influence on the stability of the chemical reactor R. There are no sufficiently precise global models for the dynamic description of the processes sequencing in the chemical reactor R.

As stated above, all external influencing quantities $\mu_i$ are therefore also not known. Important parameters, i.e. other external influencing quantities $\mu_i$, can thus change without being noticed at first, leading to malfunctions in case a critical state is reached due to variation of the external influencing quantity $\mu$. The method of the present invention thus makes it possible during operation of the chemical reactor R to recognize on the basis of a sequence of measured quantities $z_k(t_j)$ whether the state of the chemical reactor R approaches a critical state KZ.

The dynamic behavior of the reactor in the proximity of the existing stationary state, which is represented by the sequence of measured quantities $z_k(t_j)$, must thus be measured. To that end, the equilibrium state of the chemical reactor R is disturbed in that, for example, the admission volume of the entering chemical substance ECS is briefly raised or lowered. Further possibilities for bringing the chemical reactor R out of the current stationary state Z and for measuring "the return of the chemical reactor R into the stationary state" are recognized by those skilled in the art and can be easily applied.

What is important is that a determination of some state parameters is made. For example, this may be concentrations of materials contained in the chemical substance CS, the temperature T of the chemical substance CS in the chemical reactor R or the like. These are known quantities for a person skilled in the art or quantities dependent on states. For example, these can be the pressure in the chemical reactor R, electrical conductivity, etc. These measurements are undertaken in the phase wherein the chemical reactor R oscillates back into the stationary initial state.

One thus obtains a time-dependent sequence of measured quantities $z_k(t_j)\mathbf{1}$, whereby $t_j$ indicates the point in time at which the respective measured quantity was identified and the index k unambiguously identifies the respective state parameter that was measured. This may be, for example, a concentration of a substance, the temperature T of the chemical substance CS in the chemical reactor R at the point in time $t_j$ or the pressure in the chemical reactor R. The dynamic behavior of every system in the proximity of a critical state KZ can be described in specific reduced coordinates, the normal coordinates $\xi_i$.

The differential equation $\dot{x}=f(x,u)$ that describes the dynamic behavior of the chemical reactor R is transformed into an artificial coordinate system. The coordinates of this coordinate system are referred to as normal coordinates $\xi_i$. The transformed differential equation that describes the dynamics of the chemical reactor R in the normal coordinates $\xi_i$ is referred to as normal form NF.

Each normal form NF is a known and is usually a very simple parameter-dependent differential equation in one or two coordinates (J.Guckenheimer et al., Nonlinear Oscillations, Dynamical Systems, and Bifurcations of Vector Fields, Springer-Verlag, ISBN 0-540-90819-6, pp.117–165, 1983).

Figure 3:
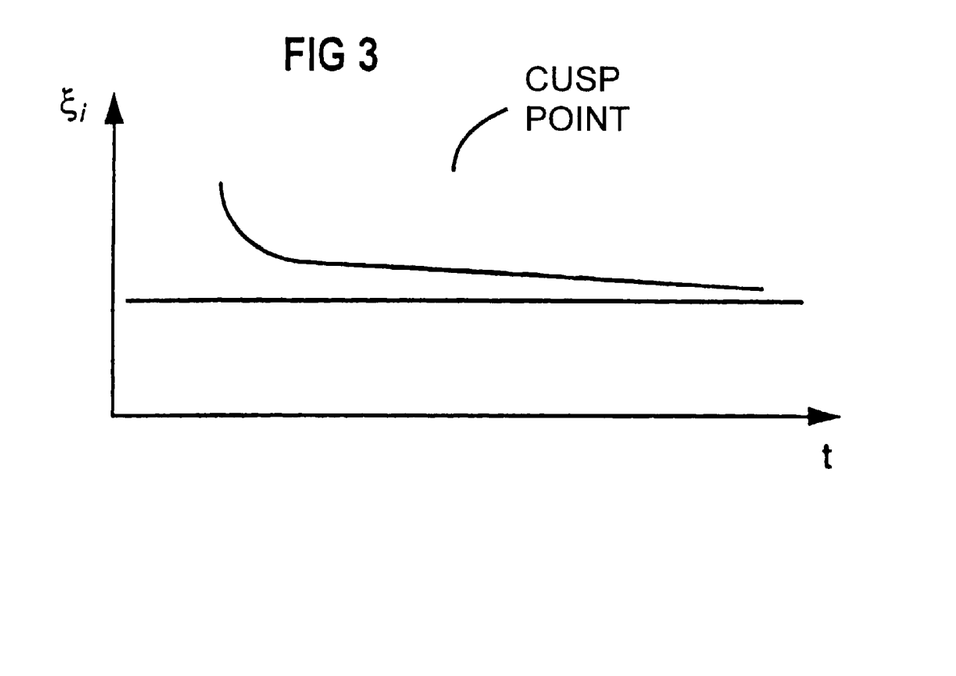
FIG. 3 illustrates a basic time curve of a trajectory in normal coordinates, as generated by a data generator that describes a cusp point.
Figure 4:
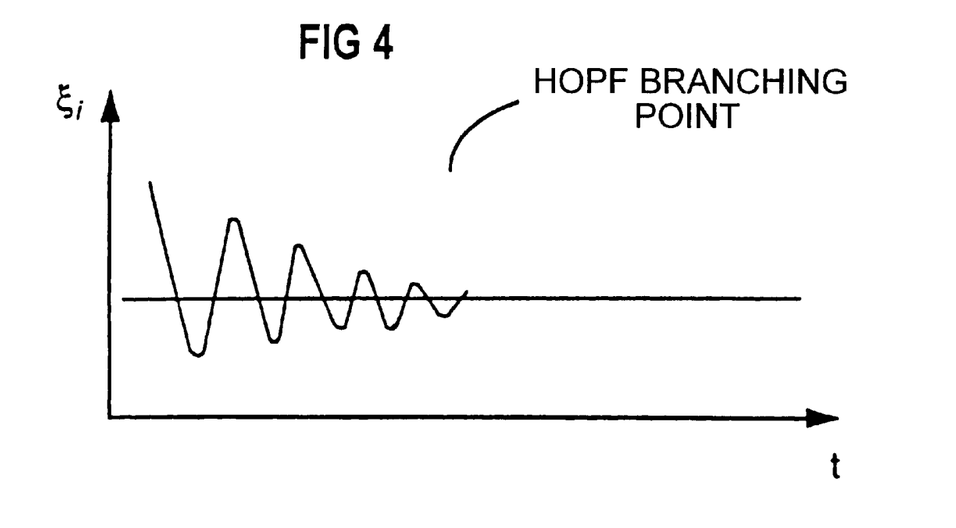
FIG. 4 illustrates a basic time curve of a trajectory in normal coordinates, as generated by a data generator that describes Hopf branching.

As is likewise known from this publication, the dynamics of various chemical reactors in the proximity of critical states KZ of the same type is represented in normal coordinates $\xi_i$ of one and the same normal form NF. Each normal form NF thus represents exactly one type of critical state KZ. Two fundamental time curves of typical solution curves of normal forms NF are shown in normal coordinates $\xi_i$ in FIGS. 3 and 4. FIG. 3 describes the curve in the environment of a cusp point UP. The critical states KZ1 and KZ3 in FIG. 2 are of this type. FIG. 4 shows a further solution curve $\xi_i(t)$ of another normal form NF in normal coordinates $\xi_i$. This normal form describes the dynamics in the environment of another type of critical state KZ, a so-called Hopf branching point HP. In FIG. 2, the critical states KZ2 and KZ4 respectively represent a Hopf branching point HP.

Other types of critical states KZ and their corresponding normal form NF are known to those skilled in the art and are described in J. Guckenheimer et al., Nonlinear Oscillations, Dynamical Systems, and Bifurcations of Vector Fields, Springer-Verlag, ISBN 0-540-90819-6, pp.117–165, 1983. The inventive method is thus not limited to the preferred exemplary embodiment with respect to the normal forms employed but can be implemented for any arbitrary normal form NF that is known to anyone skilled in the art.

Each normal form NF is a known, parameter-dependent differential equation:

$$\dot{\xi}NF(\xi,\lambda,par_p)$$

The vector $\xi$ thereby references the vector of the normal coordinates $\xi_i$. The normal coordinates $\xi_i$ can be interpreted as hidden, not directly measurable states of the chemical reactor R that are related to the real states $\underline{x}$ of the chemical reactor R via a relationship that is unknown a priori.

$\lambda$ references a stability parameter of the respective normal form NF. The distance of the real state $\underline{x}$ from a critical state KZ represented by the respective normal form NF is all the greater the more highly negative the stability parameter $\lambda$ is. When the stability parameter is $\lambda<0$, then the state of the chemical reactor R is stable. When the stability parameter is $\lambda=0$, then the state of the chemical reactor R is critical. When the stability parameter is $\lambda>0$, then the chemical reactor R is in an unstable state. The normal forms NF for the cusp point UP and for the Hopf branching point are indicated in the following table.

Cusp point UP: $\dot{\xi}=\lambda+\xi^2$,

Hopf branch point: $\dot{\xi}=A\xi+|\xi|^2B\xi$, $$A = \begin{pmatrix} \lambda & -par_1 \\ par_1 & \lambda \end{pmatrix}$$

-continued $$B = \begin{pmatrix} par_2 & -par_3 \\ par_3 & par_2 \end{pmatrix}$$

Additional normal form parameters $par_p$ more precisely define the type of critical point, i.e. the respective critical state. The index p unambiguously references the respective normal form parameter $par_p$. The index p is a natural number.

Dependent on the operational sign of the normal form parameters $par_p$, for example, one can tell whether stable, periodic states of the chemical reactor R are to be expected in the case of Hopf branching points. The modeling of the reactor dynamics of the chemical reactor R in normal coordinates $\xi_i$ thus has the advantage that simple mathematical equations are sufficient for describing the dynamics of the chemical reactor R in the immediate proximity of a critical state KZ, and the distance of the actually measured states of the chemical reactor R—which is determined by the sequence of measured quantities $z_k(t_j)$—from the closest critical state KZ can be directly read from the respective normal form NF, as can the type of critical state KZ.

However, the normal coordinates $\xi_i$ are artificial hidden non-measurable states whose relationship to the sequence of measured quantities $z_k(t_j)$ at the real chemical reactor R is initially unknown. A transformation must thus be found that images the solution curves of the normal form NF of each and every critical state KZ onto the sequence of measured quantities $z_k(t_j)$ in such a way that first what type of critical state KZ lies closes to the actual state and second how far the actual state lies from the critical state KZ can be recognized from the imaging.

Figure 5:
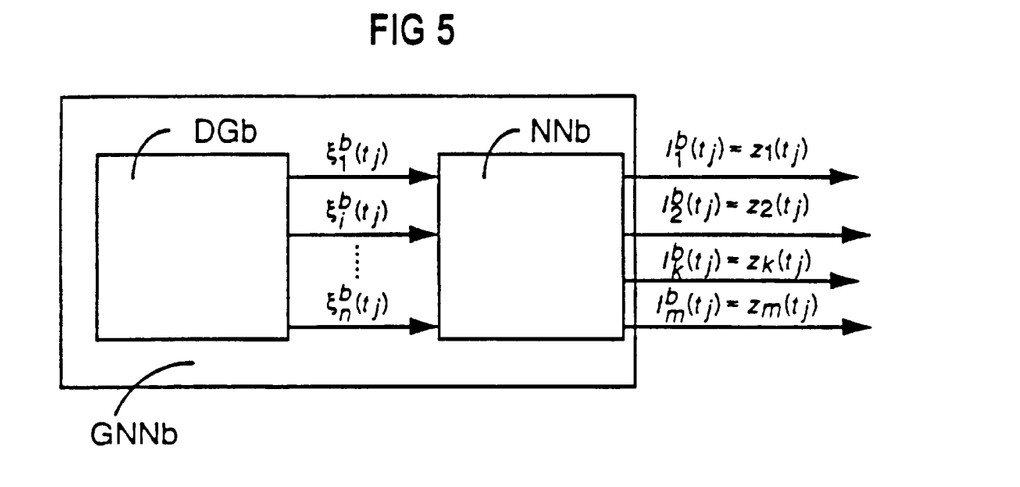
FIG. 5 illustrates a data generator and a neural network whose parameters are modified by adaptation of initial quantities of the neural network to determined measured quantities of the chemical reactor through use of a parameter optimization method.
Figure 6:
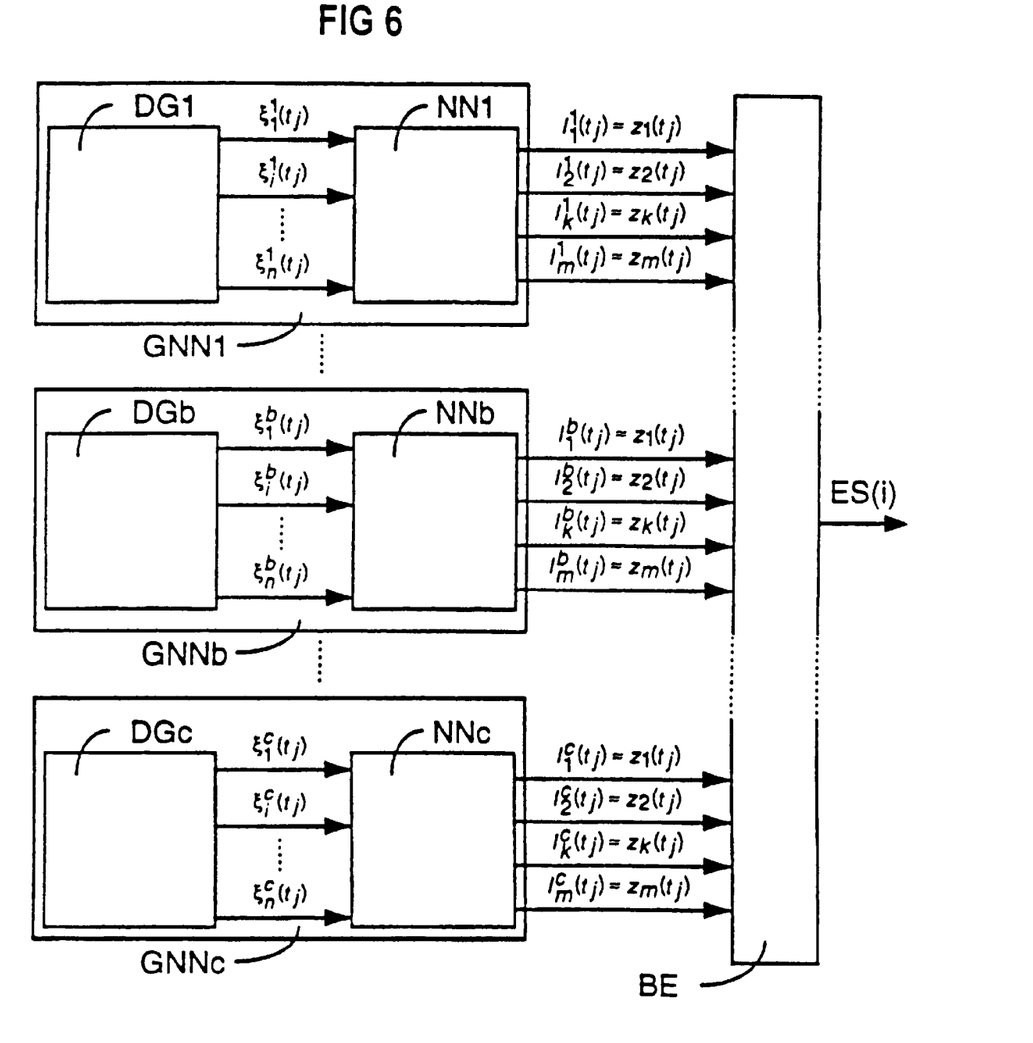
FIG. 6 illustrates a plurality of data generators and a plurality of neural networks that each respectively describe one type of critical state as state parameters of the chemical reactor.
Figure 7:
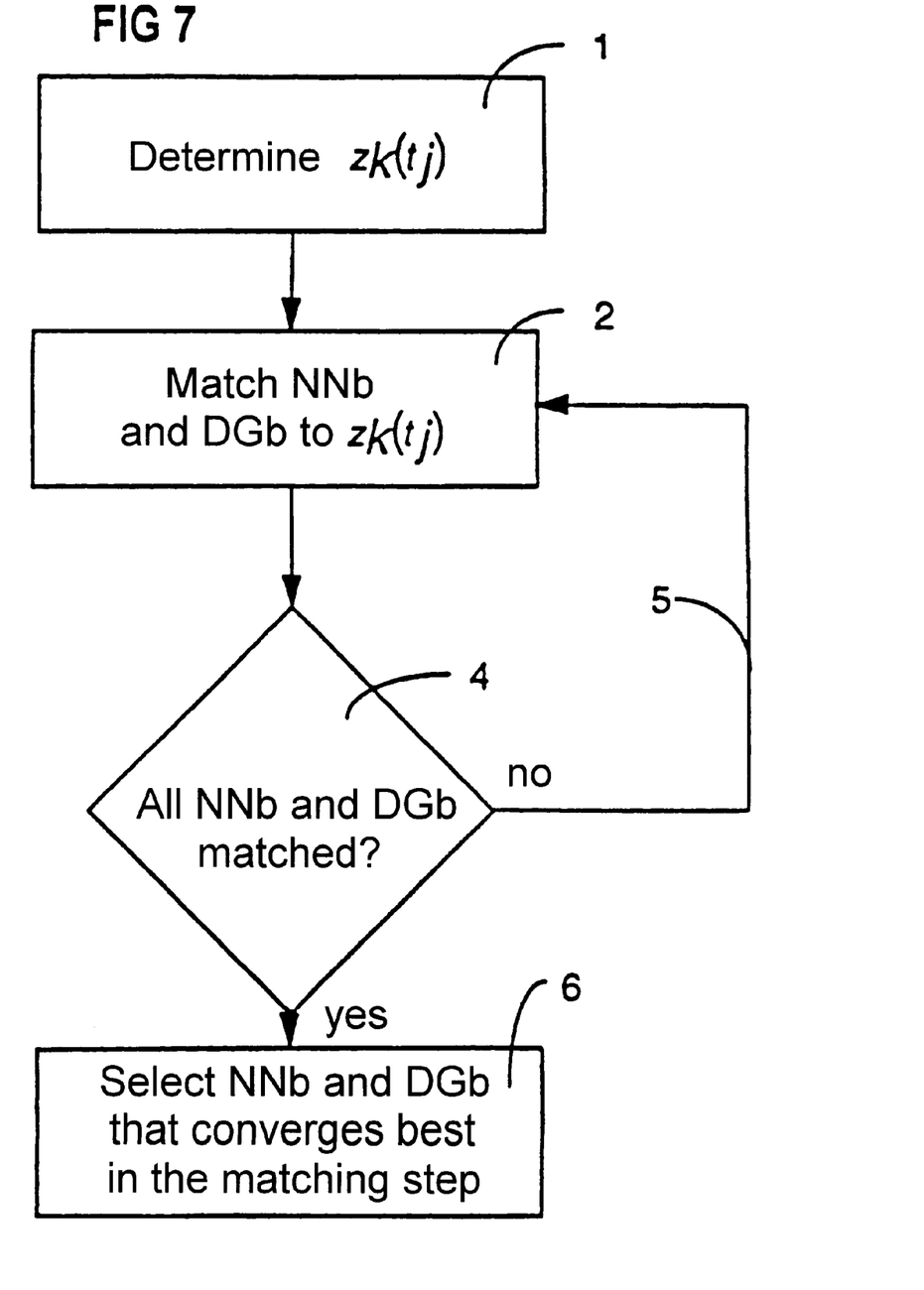
FIG. 7 is a flowchart which illustrates an exemplary embodiment of the method steps of the present invention.

As shown in FIG. 5, the transformation of normal coordinates $\xi_i$ at the point in time $t_j$ onto the sequence of measured quantities $z_k(t_j)$ is implemented by a neural network NNb at the same point in time $t_j$. An index b is a natural number and unambiguously identifies each neural network NNb.

The normal coordinates $\xi_i(t_j)$ that represent a time-dependent solution curve of a respective normal form NF, as described by way of example in FIGS. 3 and 4, are the input quantities of the neural network Nnb. The solution curves of a normal form NF in normal coordinates $\xi_i$ are respectively generated by a data generator DGb. This means that, given a plurality of c normal forms NF employed, i.e. taking different types of critical state KZ into account in the investigation of the dynamic behavior of the chemical reactor R, exactly c different data generators DGb are employed that each respectively generate solution curves of a normal form in normal coordinates $\xi_i^b(t_j)$. The index b is a natural number and likewise uniquely identifies each data generator DGb, since only one data generator DGb is allocated to a neural network NNb.

This also means that a respectively separate neural network NNb is provided for each data generator DGb that is employed. The plurality n of inputs or each neural network NNb is equal to the plurality of different normal coordinates $\xi_i^b(t_j)$, i.e. the dimension of the normal coordinate vector $\xi$.

The plurality of outputs of each neural network NNb is equal to the plurality of measured quantities $z_k(t_j)$ that were determined from the chemical reactor R and describe the actual current state of the chemical reactor R. The as yet unknown transformation of normal coordinates $\xi_i$ onto the sequence of measured quantities $z_k(t_j)$ is approximately found in that all neural networks NNb and all data generators DGb are adapted 2, 4 and 5 to the sequence of measured quantities $z_k(t_j)$. Respectively, one data generator DGb and one neural network NNb are allocated to one another and are respectively adapted to the sequence of measured quantities $z_k(t_j)$, i.e. output quantities $I_k^b(t_j)$ of the neural network NNb and are respectively adapted to the sequence of measured quantities $z_k(t_j)$. A respective output quantity $I_k^b(t_j)$ of a neural network NNb is adapted to a measured quantity $z_k(t_j)$. An index b references the neural network NNb and the corresponding data generator DGb for each output quantity $I_k^b(t_j)$ of a neural network NNb. A further index k uniquely references the corresponding output of a neural network NNb that is to be adapted to the respective measured quantity $z_k(t_j)$.

The neural network NNb and the parameter adaptation problem for the calculation of the stability parameter A and the normal form parameters $par_p$ are solved with the known algorithms for solving an optimization problem of numerical mathematics, for example, with the Levenberg-Marquardt method (P. Gill et al., Practical Optimization, Academic Press, London, ISBN 0-12-283952-8, pp.136–137, 1981, and J. More, The Levenberg-Marquardt Algorithm: Implementation and Theory, Numerical Analysis, Lecture Notes in Mathematics 630, Springer Verlag, pp.105–116, 1977).

Any other desired parameter optimization methods at the command of anyone skilled in the art can also be employed. The adaptation of the neural network NNb and the adaptation of the data generator DGb can be combined into a parameter optimization problem of a large neural network GNNb. Only one parameter optimization problem or, respectively, parameter adaptation problem thus has to be solved (see FIG. 5).

Because the type of critical state KZ in whose proximity the actual, current state of the chemical reactor R is located is not known a priori, it is advantageous to consider a plurality of different normal forms NF and, thus, a plurality of different data generators DGb and a plurality of different neural networks NNb allocated thereto.

Depending on the performance capability of the process control computer that implements the parameter optimization, an arbitrary plurality of critical states KZ of a higher order can be investigated also. The parameter optimization can be implemented according to the greatest variety of criteria. For example, this criterion could be that the combination of data generator DGb and neural network NNb is adapted optimally well to the sequence of measured quantities $z_k(t_j)$ in such a way that a quadratic error err is minimized.

$$err = \sum_{j=1}^{s} \sum_{k=1}^{m} |I_k^b(t_j) - z_k(t_j)|^2 \to \min$$

Similarly, conceivable and easily replicated by a person skilled in the art, an arbitrary optimization criterion can be applied. For example, this may be the minimization of the absolute amount of the maximum deviation or similar optimization.

Since every normal form NF in normal coordinates $\xi_i$ generates curves having an intrinsic extremely characteristic course that substantially differs from the course of other curves of other normal forms NF in normal coordinates $\xi_j$, as also shown in FIGS. 3 and 4, exactly one neural network NNb and the data generator DGb allocated to the neural network NNb respectively converges better for a specific sequence of measured quantities $z_k(t_j)$ by orders of magnitude. For example, this is faster and up to an approximation error that is smaller by orders of magnitude than the other neural networks NN and the data generators DG allocated to them.

A conclusion is drawn from this convergence behavior in an evaluation unit BE as to which neural network NNb, which data generator DGb and, thus, which normal form NF lies closest to the actual state. The transformation of the normal form NF converging best is implemented by the respective neural network NNb that is allocated to the normal form NF that can be imaged best onto the sequence of measured quantities $z_k(t_j)$. The convergence behavior of all large neural networks GNNb thus directly yields information about what type of critical state KZ, i.e. what normal form NF, lies closest 6 to the actual state of the chemical reactor R.

After implementing the parameter optimization method, the stability parameter A and the normal form parameters $par_p$ of that normal form NF that converged best to the sequence of measured quantities $z_k(t_j)$ in the adaptation is also known. This is because they are explicitly present as optimized parameters after the parameter optimization method. These parameters can be additionally contained in a result signal ES(I) that is made available by the evaluation unit BE. Additionally, information about what type of normal form NF lies closest to the critical state KZ can be contained in the result signal ES(I).

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

I claim as my invention:

1. A method for determining state parameters of a chemical reactor with a plurality of neural networks having n inputs and m outputs comprising the steps of:

bringing the chemical reactor out of a stationary state;

measuring quantities from the chemical reactor in a phase wherein the chemical reactor oscillates back into the stationary state;

determining from the measured quantities a sequence of measured quantities ($z_k(t_j)$; k=1 . . . m) for the chemical reactor where $t_j$(j=1 . . . s) is a point in time at which the sequence of measured quantities ($z_k(t_j)$) was determined;

generating a plurality of individual curves in normal coordinates ($\xi_i$; l=1 . . . n) with individual ones of a plurality data generators based on a predetermined normal form that describes a critical state of the chemical reactor;

allocating the plurality of neural networks (NNb) respectively in one-to-one correspondence to the data generators and applying the curves in normal coordinates to the neural networks;

wherein each neural network is adapted to the sequence of measured quantities ($z_k(t_j)$) with a parameter optimization method; and determining and processing a parameter which represents the state parameters of the chemical reactor based an the neural network which is selected in light of the parameter optimization.

2. A method according to claim 1, wherein the state parameters of the chemical reactor comprise at least one stability parameter.

3. The method according to claim 1, wherein the state parameters of the chemical reactor comprise at least one parameter that enables evaluation of a type of critical state of the chemical reactor lying closest to a present state of the chemical reactor.

4. A method according to claim 1 further comprising a plurality of neural networks and a plurality of data generators and further wherein the neural network and the data generator that converges best during parameter optimization has parameters which are employed as the state parameters of the chemical reactor.

* * * * *